US009359524B2

(12) United States Patent
Breon et al.

(10) Patent No.: US 9,359,524 B2
(45) Date of Patent: Jun. 7, 2016

(54) POLYESTERS AND COATINGS CONTAINING THE SAME

(71) Applicant: PPG Industries Ohio, Inc., Cleveland, OH (US)

(72) Inventors: Jonathan P. Breon, Pittsburgh, PA (US); Ljiljana Maksimovic, Allison Park, PA (US); Anthony M. Chasser, Allison Park, PA (US); Edward R. Millero, Gibsonia, PA (US); John E. Schwendeman, Wexford, PA (US); Robert E. Jennings, Ellwood City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 57 days.

(21) Appl. No.: 14/054,126

(22) Filed: Oct. 15, 2013

(65) Prior Publication Data
US 2015/0105518 A1 Apr. 16, 2015

(51) Int. Cl.
| | |
|---|---|
| *C08G 63/06* | (2006.01) |
| *C08G 63/12* | (2006.01) |
| *C08G 63/123* | (2006.01) |
| *C08G 63/137* | (2006.01) |
| *C08G 63/16* | (2006.01) |
| *C08G 63/199* | (2006.01) |
| *C09D 5/03* | (2006.01) |
| *C09D 7/00* | (2006.01) |
| *C09D 167/02* | (2006.01) |
| *C09D 167/03* | (2006.01) |
| *C09D 167/04* | (2006.01) |
| *C09D 167/00* | (2006.01) |
| *C08G 18/79* | (2006.01) |
| *C08G 63/127* | (2006.01) |
| *C09D 175/04* | (2006.01) |
| *C08G 18/42* | (2006.01) |

(52) U.S. Cl.
CPC .......... *C09D 167/00* (2013.01); *C08G 18/4219* (2013.01); *C08G 18/792* (2013.01); *C08G 63/12* (2013.01); *C08G 63/127* (2013.01); *C09D 175/04* (2013.01); *C08G 63/06* (2013.01); *C08G 63/065* (2013.01); *C08G 63/123* (2013.01); *C08G 63/137* (2013.01); *C08G 63/16* (2013.01); *C08G 63/199* (2013.01); *C09D 5/03* (2013.01); *C09D 7/00* (2013.01); *C09D 167/02* (2013.01); *C09D 167/03* (2013.01); *C09D 167/04* (2013.01); *Y10T 428/31786* (2015.04); *Y10T 428/31794* (2015.04)

(58) Field of Classification Search
None
See application file for complete search history.

(56) References Cited

U.S. PATENT DOCUMENTS

| | | | | |
|---|---|---|---|---|
| 3,883,454 | A | | 5/1975 | Dhein et al. |
| 3,978,153 | A | * | 8/1976 | Sato ............ C08G 9/3209 525/135 |
| 4,135,009 | A | * | 1/1979 | Mercurio ............ C08G 63/20 106/168.01 |
| 4,315,053 | A | * | 2/1982 | Poth ............ C08G 63/20 427/388.3 |
| 5,168,110 | A | * | 12/1992 | Van Den Elshout . C07D 303/16 525/438 |
| 5,266,657 | A | * | 11/1993 | Hammerton ....... C09D 133/064 525/437 |
| 5,464,909 | A | * | 11/1995 | Chang .............. C09D 167/00 525/437 |
| 5,474,854 | A | | 12/1995 | Kagami et al. |
| 5,552,475 | A | | 9/1996 | Sundararaman et al. |
| 5,580,660 | A | * | 12/1996 | Witte ............... C08G 18/42 427/385.5 |
| 5,852,162 | A | * | 12/1998 | Smith .............. C08G 63/58 528/190 |
| 6,028,162 | A | | 2/2000 | Hahn et al. |
| 6,469,129 | B1 | | 10/2002 | Cook et al. |
| 7,317,068 | B2 | | 1/2008 | Burgo |
| 7,659,341 | B2 | | 2/2010 | Wamprecht et al. |
| 7,763,323 | B2 | * | 7/2010 | Mayr ................ C08G 18/542 427/384 |
| 7,763,683 | B2 | | 7/2010 | Nefzger et al. |
| 8,419,968 | B2 | | 4/2013 | Carr et al. |
| 2002/0013404 | A1 | * | 1/2002 | Buter ............... C08G 18/0828 524/604 |
| 2008/0152607 | A1 | | 6/2008 | Malle et al. |
| 2009/0162303 | A1 | | 6/2009 | Barba et al. |
| 2011/0224323 | A1 | | 9/2011 | Bigwood et al. |
| 2011/0281115 | A1 | | 11/2011 | Kania et al. |
| 2012/0108784 | A1 | * | 5/2012 | Clauss ............ C08G 63/12 528/302 |
| 2013/0034741 | A1 | | 2/2013 | Mauer, III et al. |

FOREIGN PATENT DOCUMENTS

| | | | |
|---|---|---|---|
| GB | 1 453 127 | * | 10/1976 |
| GB | 2014875 A | | 9/1979 |
| JP | 49-048749 | * | 5/1974 |
| JP | 49-120930 | * | 11/1974 |
| JP | 50-124932 | * | 10/1975 |

* cited by examiner

Primary Examiner — Vivian Chen
(74) Attorney, Agent, or Firm — Justin P. Martinchek

(57) ABSTRACT

Disclosed is a polyester prepared from a mixture of reactants including: a) an aromatic monoacid, where the aromatic monoacid includes from 25 to 60 weight % based on the total weight of reactants; b) a polyacid, where the polyacid includes less than 90 mole % isophthalic acid; and c) a polyol having at least 3 hydroxyl groups. The mixture of reactants is substantially free of a non-aromatic monoacid, and said polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 s$^{-1}$), and an acid value of less than 15 mg KOH/g. The polyacid can also be an aliphatic polyacid. Coatings comprising the same and substrates coated at least in part with such coatings are also disclosed.

18 Claims, No Drawings

POLYESTERS AND COATINGS CONTAINING THE SAME

FIELD OF THE INVENTION

The present invention relates to polyesters, coatings comprising such polyesters, and substrates to which such coatings are applied.

BACKGROUND OF THE INVENTION

Conventional polyesters are prepared from various combinations of alcohols and acids. These polyesters have been used to form coatings that, in turn, can be used to coat metallic and non-metallic substrates. It is often desired that these polyester coatings have particular decorative and/or performance properties. For instance, it may be desirable that a coating exhibit good chemical resistance, mar resistance, and/or resistance to weathering. In addition, it may also be desirable to produce a high-solids coating that has a low amount of volatile organic compounds (VOCs).

SUMMARY OF THE INVENTION

In certain embodiments, the present invention is directed to a polyester prepared from a mixture of reactants including: a) an aromatic monoacid, where the aromatic monoacid comprises from 25 to 60 weight % based on the total weight of reactants; b) a polyacid, where the polyacid comprises less than 90 mole % isophthalic acid; and c) a polyol having at least 3 hydroxyl groups. The mixture of reactants is substantially free of a non-aromatic monoacid, and the polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), and an acid value of less than 15 mg KOH/g.

In certain embodiments, the present invention is directed to a polyester prepared from a mixture of reactants consisting essentially of: a) an aromatic monoacid, where the aromatic monoacid comprises from 25 to 60 weight % based on the total weight of reactants; b) a polyacid, where the polyacid comprises less than 90 mole % isophthalic acid; and c) a polyol having at least 3 hydroxyl groups. The mixture of reactants is substantially free of a non-aromatic monoacid, and the polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), and an acid value of less than 15 mg KOH/g.

In certain embodiments, the present invention is directed to a polyester prepared from a mixture of reactants including: a) an aromatic monoacid, where the aromatic monoacid includes from 25 to 60 weight % based on the total weight of reactants; b) an aliphatic polyacid; and c) a polyol having at least 3 hydroxyl groups. The mixture of reactants is substantially free of a non-aromatic monoacid, and the polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), and an acid value of less than 15 mg KOH/g.

In certain embodiments, the present invention is directed to a coating composition that includes a polyester and a crosslinker. The polyester is prepared from a mixture of reactants including: 1) an aromatic monoacid, where the aromatic monoacid comprises from 25 to 60 weight % based on the total weight of reactants; 2) a polyacid, where the polyacid comprises less than 90 mole % isophthalic acid; and 3) a polyol having at least 3 hydroxyl groups. The mixture of reactants is substantially free of a non-aromatic monoacid, and said polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), and an acid value of less than 15 mg KOH/g.

In certain embodiments, the present invention is directed to a coating composition that includes a polyester and a crosslinker. The polyester is prepared from a mixture of reactants including: 1) an aromatic monoacid, where the aromatic monoacid comprises from 25 to 60 weight % based on the total weight of reactants; 2) an aliphatic polyacid; and 3) a polyol having at least 3 hydroxyl groups. The mixture of reactants is substantially free of a non-aromatic monoacid, and the polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), and an acid value of less than 15 mg KOH/g.

In certain embodiments, a substrate is coated at least in part with any of the coating compositions described above.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" aromatic monoacid, "a" polyacid, "a" polyol, "an" aliphatic polyacid, and the like refers to one or more of any of these items.

As used herein, the transitional term "comprising" (and other comparable terms, e.g., "containing," and "including") is "open-ended" and is used in reference to compositions, methods, and respective component(s) thereof, that are essential to the invention, yet open to the inclusion of unspecified matter. The term "consisting essentially of" refers to those component(s) required for a given embodiment and permits the presence of component(s) that do not materially affect the properties or functional characteristic(s) of that embodiment. The term "consisting of" refers to compositions and methods that are exclusive of any other component not recited in that description of the embodiment.

As indicated, the present invention is directed to polyester polymers that may be used to form coatings including, but not limited to, clear coatings and pigmented coatings that can be applied to at least a portion of a substrate. As used herein, the term "polymer" refers to oligomers and both homopolymers and copolymers. The term "resin" is used interchangeably with "polymer".

In certain embodiments, the polyester is prepared from a mixture of reactants that includes an aromatic monoacid, a polyacid, and a polyol. As used herein, the term "aromatic" refers to a cyclically conjugated hydrocarbon with a stability (due to delocalization) that is significantly greater than that of a hypothetical localized structure, and the term "monoacid" refers to a compound having a single acid group and includes the ester and anhydride of the acid. As such, an "aromatic monoacid" refers to a compound that includes a cyclically conjugated hydrocarbon with a stability that is significantly greater than that of a hypothetical localized structure and which also includes a single acid group or the ester and anhydride of the acid. Non-limiting examples of aromatic monoacids that can be used to prepare the polyester include benzoic acid, hydroxybenzoic acids such as 4-hydroxybenzoic acid, salicylic acid, nicotinic acid, naphthoic acids, cinnamic acid, phenylpropanoic acid, and mixtures thereof.

In certain embodiments, the mixture of reactants used to prepare the polyester comprises at least 25 weight % of an aromatic monoacid based on the total weight of the reactants. In some of these embodiments, the mixture of reactants comprises from 25 weight % to 60 weight % of an aromatic monoacid based on the total weight of the reactants. In other embodiments, the mixture of reactants comprises from 30 weight % to 50 weight % of an aromatic monoacid, based on the total weight of the reactants.

In certain embodiments, the mixture of reactants used to prepare the polyester may be substantially free, may be essentially free, and may be completely free of non-aromatic monoacids. The term "substantially free of non-aromatic monoacids" means that the mixture of reactants contains less than 1000 parts per million (ppm) of non-aromatic monoacids, "essentially free of non-aromatic monoacids" means that the mixture of reactants contains less than 100 ppm of non-aromatic monoacids, and "completely free of non-aromatic monoacids" means that the mixture of reactants contains less than 20 parts per billion (ppb) of non-aromatic monoacids.

As used herein, the term "non-aromatic monoacid" refers to aliphatic monoacids including esters and anhydrides of these acids. As used herein, the term "aliphatic" refers to an organic compound or radical characterized by a straight chain or branched chain structure, or closed ring structure, all of which contains saturated carbon bonds, and, optionally, one or more conjugated or unconjugated carbon-carbon unsaturated bonds, such as a carbon-carbon double bond, but does not include a cyclically conjugated structure with a stability that is significantly greater than that of a hypothetical localized structure. Thus, an aliphatic monoacid does not contain an aromatic moiety. Non-limiting examples of non-aromatic monoacids include cycloaliphatic carboxylic acids, including cyclohexane carboxylic acid, $C_1$-$C_{18}$ aliphatic carboxylic acids such as acetic, propanoic, butanoic, hexanoic, heptanoic, octanoic, and mixtures thereof.

As mentioned above, the polyester can also be prepared with a polyacid. As used herein, the term "polyacid" refers to a compound having two or more acid groups and includes the ester and anhydride of the acid. The polyacids used to prepare the polyester can include, but are not limited to, aromatic polyacids, non-aromatic polyacids (i.e., aliphatic polyacids including cyclic aliphatic polyacids (also referred to as alicyclic polyacids), straight chain aliphatic polyacids, and branched aliphatic polyacids), and mixtures thereof.

Non-limiting examples of aromatic polyacids that can be used to prepare the polyester include terephthalic acid, isophthalic acid, orthophthalic acid, trimellitic acid, and mixtures thereof. In such embodiments where aromatic polyacids are used to prepare the polyester, the polyacid comprises less than 90 mole % isophthalic acid, including its ester and anhydride, based on the total polyacids used to prepare the polyester. For instance, in certain embodiments, the polyacid comprises from 0 mole % (i.e., completely free of isophthalic acid, its ester and anhydride) to 89 mole % isophthalic acid, including its ester and anhydride, based on the total polyacids used to prepare the polyester. In certain embodiments, the polyacid comprises from 0 mole % to 85 mole % isophthalic acid, including its ester and anhydride, such as 0% to 60%, 0% to 40%, or 0% to 20% based on the total polyacids used to prepare the polyester. In certain embodiments, the polyacid comprises from 0 mole % to 10 mole % isophthalic acid, including its ester and anhydride, based on the total polyacids used to prepare the polyester. In some of these embodiments where aromatic polyacids are used to prepare the polyester, the polyacid comprises 0 mole % isophthalic acid, including its ester and anhydride (i.e., completely free of isophthalic acid, including its ester and anhydride), based on the total polyacids used to prepare the polyester.

As indicated, in certain embodiments, the polyacid is a non-aromatic polyacid (i.e. aliphatic polyacid). Non-limiting examples of non-aromatic, i.e., aliphatic, polyacids include succinic acid, adipic acid, hexahydrophthalic anhydride (HHPA), cyclohexanedicarboxylic acid (CHDA), hydrogenated $C_{36}$ dimer fatty acids, azelaic acid, sebacic acid, glutaric acid, dodecanoic diacid, cyclohexanedioic acid, and mixtures thereof.

In certain embodiments, the polyacid comprises 10 carbons or less. Non-limiting examples of polyacids that have 10 carbons or less that can be used to prepare the present polyesters include any of the polyacids mentioned above that have 10 carbons or less including, but not limited to, succinic acid, adipic acid, hexahydrophthalic anhydride (HHPA), cyclohexanedicarboxylic acid (CHDA), and mixtures thereof.

In certain embodiments, the mixture of reactants used to prepare the polyester comprises less than 40 weight % of polyacids, based on the total weight of the reactants. In other embodiments, the mixture of reactants used to prepare the polyester comprises less than 30 weight % of polyacids, based on the total weight of the reactants. In some of these embodiments, the mixture of reactants used to prepare the polyester comprises from 10 weight % to 30 weight % of polyacids, based on the total weight of the reactants.

As mentioned above, the mixture of reactants that can be used to prepare the polyester can also include a polyol. As used herein, the term "polyol" refers to an alcohol containing two or more hydroxyl groups. In certain embodiments, the polyol used to prepare the polyester includes three or more hydroxyl groups. Non-limiting examples of polyols having three or more hydroxyl groups that can be used to prepare the polyester include trimethylol propane, di-trimethylol propane, pentaerythritol, di-pentaerythritol, trimethylol ethane, trimethylol butane, glycerol, tris(2-hydroxyethyl) isocyanurate, and mixtures thereof.

In certain embodiments, the mixture of reactants that can be used to prepare the polyester includes a mixture of polyols comprising a first polyol with three or more hydroxyl groups and a second polyol with two hydroxyl groups. Non-limiting examples of polyols having three or more hydroxyl groups that can be used in such a polyol mixture include any of the non-limiting examples mentioned above. Non-limiting examples of polyols with two hydroxyl groups that can be used in such a polyol mixture include ethylene glycol, propylene glycol, neopentyl glycol, hydrogenated bisphenol A, cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; 2,2,4-trimethyl-1,3-pentanediol, cyclohexanedimethanol; hexanediols including 1,6-hexanediol; 2-ethyl-1,3-hexanediol, and mixtures thereof.

In certain embodiments, the polyol comprises at least 25 weight % based on the total weight of the reactants. In some of these embodiments, the polyol comprises from 25 weight % to 60 weight % based on the total weight of the reactants. In certain of these embodiments, the polyol comprises from 35 weight % to 60 weight % based on the total weight of the reactants.

The polyester prepared from the mixture of reactants described above can have a weight average molecular weight of less than 3,000 g/mol, such as less than 2,500 g/mol, or less than 2,000 g/mol, with the weight average molecular weight being determined by gel permeation chromatography using a polystyrene standard. In certain embodiments, the polyester prepared from the mixture of reactants described above has a molecular weight of less than 1,500 g/mol, as determined by gel permeation chromatography using a polystyrene standard.

In addition to the molecular weight, the polyester can have a dynamic viscosity of greater than 15,000 centipoise at 40° C., such as greater than 25,000 centipoise at 40° C., such as greater than 35,000 centipoise at 40° C., or greater than 45,000 centipoise at 40° C. As used herein, the term "dynamic viscosity" refers to the tangential force per unit area required to move one horizontal plane with respect to the other at unit velocity when maintained at a distance apart by the fluid. Dynamic viscosity is also referred to as absolute viscosity. The dynamic viscosity of the polyester of the present invention is measured on a Physica MCR 301 rheometer with 25 mm parallel plate and 0.1 mm gap as a function of increasing shear rate (0.1 to 10 s$^{-1}$). The dynamic viscosity of the polyester was determined neat with no solvent.

In certain embodiments, when measured at 110° C., the polyester has a dynamic viscosity of greater than 6,000 centipoise at 110° C., such as greater than 7,000 centipoise at 110° C., such as greater than 9,000 centipoise at 110° C., or greater than 11,000 centipoise at 110° C.

After measuring the dynamic viscosity, the kinematic viscosity of the polyester can also be determined. As used herein, the term "kinematic viscosity" refers to the ratio of dynamic viscosity to density of the polyester. For instance, in certain embodiments, the polyester can have a kinematic viscosity of greater than 10,000 centistoke at 40° C., such as greater than 20,000 centistoke at 40° C., such as greater than 30,000 centistoke at 40° C., or greater than 40,000 centistoke at 40° C. The density of the polyester at 40° C. was measured using a U.S. Standard Weight Per Gallon cup.

In certain embodiments, the polyesters of the present invention have a glass transition temperature (Tg) of less than 20° C., such as less than 10° C., or less than 0° C. In certain embodiments, the glass transition temperature of the polyester is less than −5° C. As used herein, "glass transition temperature" refers to the temperature at which an amorphous material changes from a brittle, vitreous state to a plastic state as determined by differential scanning calorimetry.

Further, in certain embodiments, the polyesters of the present invention have a hydroxyl value ranging from 140 mg KOH/g to 340 mg KOH/g. In some embodiments, the polyesters have a hydroxyl value ranging from 170 mg KOH/g to 340 mg KOH/g. In certain embodiments, the polyesters have a hydroxyl value ranging from 190 mg KOH/g to 300 mg KOH/g.

The polyesters of the present invention can have an acid value of less than 15 mg KOH/g. In certain embodiments, the polyesters have an acid value of less than 10 mg KOH/g, such as less than 7 mg KOH/g, or less than 5 mg KOH/g. In certain embodiments, the polyesters have an acid value of less than 2 mg KOH/g.

It was found that polyesters of the present invention do not form a gel even when reacted to near completion (>98% reaction as determined by measuring the acid value of the reaction mixture), which can occur with other polyesters. As such, the polyesters of the present invention can be prepared without using special equipment or burdensome preparation methods to prevent gelling.

In certain embodiments, the polyester of the present invention has a polydispersity of less than 3.5, such as less than 3.0, or less than 2.5. In some embodiments, the polydispersity of the polyester is less than 2, such as between 1.8 and 2.0. As used herein, "polydispersity" refers to the weight average molecular weight of a polymer divided by the number average molecular weight of the polymer, with both weight average and number average molecular weight being evaluated using gel permeation chromatography and a polystyrene standard. Polydispersity reflects the distribution of individual molecular weights in a polymer sample.

In certain embodiments, the polyester of the present invention has a refractive index of greater than 1.4, such as greater than 1.45, or greater than 1.48. In some embodiments, the refractive index of the polyester is 1.48 to 1.80, such as 1.48 to 1.60, or 1.51 to 1.54. As used herein, "refractive index" refers to the change in direction (i.e. apparent bending) of a light ray passing from one medium to another. The refractive index can be measured using a refractometer such as a Bausch and Lomb Refractometer.

In certain embodiments, the polyesters of the present invention are prepared from a mixture of reactants consisting essentially of a) an aromatic monoacid, where the aromatic monoacid comprises from 25 weight % to 60 weight % based on the total weight of reactants; b) a polyacid, where the polyacid comprises less than 90 mole % isophthalic acid; and c) a polyol comprising at least 3 hydroxyl groups, wherein the mixture of reactants is substantially free of a non-aromatic monoacid, and said polyester has a dynamic viscosity of greater than 15,000 centipoise at 40° C. and an acid value of less than 15 mg KOH/g.

In certain embodiments, the polyester of the present invention is dissolved or dispersed in a solvent or a mixture of solvents. Typically, solvents that can be used to dissolve or disperse the polyester include, but are not limited to, water, organic compounds, and mixtures thereof. In certain embodiments, the solvent may be substantially free, may be essentially free, and may be completely free of water. The term "substantially free of water" means that the solvent contains less than 1000 parts per million (ppm) of water, "essentially free of water" means that the solvent contains less than 100 ppm of water, and "completely free of water" means that the solvent contains less than 20 parts per billion (ppb) of water.

Non-limiting examples of organic solvents that can be used to dissolve or disperse the polyester include glycols, glycol ether alcohols, alcohols, and ketones. Other non-limiting examples of organic solvents include aromatic hydrocarbons, such as xylene and toluene and those available from Exxon-Mobil Chemical Company under the Solvesso trade name; acetates including glycol ether acetates, ethyl acetate, n-butyl acetate, n-hexyl acetate, and mixtures thereof; mineral spirits, naphthas and/or mixtures thereof. "Acetates" include the glycol ether acetates.

In certain embodiments, the amount of solvent added to disperse or dissolve the polyester is such that the polyester is 30 to 95 weight % based on resin solids. In certain embodiments, the amount of solvent added to disperse or dissolve the branched polyester is such that the polyester is 60 to 95 weight %, such as 85 weight %, based on resin solids. As a result, polyesters with extremely low VOCs may be obtained.

As mentioned above, the present invention is also directed to coating compositions that include any of the polyesters described above and a crosslinker. The crosslinker may be chosen to be reactive with the functional group or groups on the polyester. It will be appreciated that the coatings of the present invention can cure through the reaction of the hydroxyl groups and/or other functionality in the polyester and the crosslinker.

Non-limiting examples of crosslinkers include phenolic resins, amino resins, epoxy resins, beta-hydroxy (alkyl) amide resins, alkylated carbamate resins, isocyanates, polyacids, anhydrides, organometallic acid-functional materials, polyamines, polyamides, aminoplasts, and mixtures thereof.

Non-limiting examples of isocyanates include multifunctional isocyanates. Examples of multifunctional polyisocyanates include aliphatic diisocyanates such as hexamethylene diisocyanate and isophorone diisocyanate, and aromatic diisocyanates such as toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. Pat. No. 8,389,113, incorporated by reference in pertinent part herein. Suitable polyisocyanates are well known in the art and widely available commercially. Examples of commercially available isocyanates include Desmodur N 3300A, Desmodur Z 4470BA, Desmodur N 3900, and Desmodur N 3400, which are commercially available from Bayer Corporation.

Non-limiting examples of aminoplasts include condensates of amines and/or amides with aldehyde. The most common amines or amides are melamine, urea, or benzoguanamine. For example, the condensate of melamine with formaldehyde is a suitable aminoplast. However, condensates with other amines or amides can be used; for example, aldehyde condensates of glycoluril. While the aldehyde used is most often formaldehyde, other aldehydes such as acetaldehyde, crotonaldehyde, and benzaldehyde may be used.

The aminoplast contains methylol groups and at least a portion of these groups may be etherified with an alcohol to modify the cure response. Any monohydric alcohol may be employed for this purpose including methanol, ethanol, butanol, and hexanol. Suitable aminoplasts resins, such as Cymel 202 or Cymel 303, are acceptable examples acting as curatives and are available from Cytec Industries.

In certain embodiments, to prepare coatings using the polyesters and crosslinkers described above, the polyesters and crosslinkers can be dissolved or dispersed in a solvent or a mixture of solvents. In certain embodiments, the solvent may be substantially free, may be essentially free, and may be completely free of water. The term "substantially free of water" means that the solvent contains less than 1000 parts per million (ppm) of water, "essentially free of water" means that the solvent contains less than 100 ppm of water, and "completely free of water" means that the solvent contains less than 20 parts per billion (ppb) of water.

Non-limiting examples of solvents that can be used to dissolve or disperse the polyesters and crosslinkers include any of the solvents described above. For instance, in certain embodiments, the solvent is an organic solvent that can include, but is not limited to, glycols, glycol ether alcohols, alcohols, and ketones; aromatic hydrocarbons, such as xylene and toluene and those available from Exxon-Mobil Chemical Company under the Solvesso trade name; acetates including glycol ether acetates, ethyl acetate, n-butyl acetate, n-hexyl acetate, and mixtures thereof; mineral spirits, naphthas and/or mixtures thereof. "Acetates" include the glycol ether acetates.

In certain embodiments, the coatings of the present invention may comprise from 1 to 100 weight %, such as from 5 to 80 weight %, or from 10 to 60 weight % of the polyesters described herein based on the total weight of the coating composition.

In certain embodiments, the coatings of the present invention comprise from 0 to 80 weight %, such as from 5 to 60 weight %, or from 8 to 40 weight % of a crosslinker or combination of crosslinkers based on the total weight of the coating composition.

It will be appreciated that the polyesters of the present invention (and crosslinkers if used) can form all or part of the film-forming resin of the coating. In certain embodiments, one or more additional film-forming resins are also used in the coating. For example, the coating compositions can comprise any of a variety of thermoplastic and/or thermosetting compositions known in the art.

Thermosetting or curable coating compositions typically comprise film-forming polymers or resins having functional groups that are reactive with either themselves or a crosslinking agent. The additional film-forming resin can be selected from, for example, acrylic polymers, additional polyester polymers that are the same or different than those described above, polyurethane polymers, polyamide polymers, polyether polymers, polysiloxane polymers, polyepoxy polymers, epoxy resins, vinyl resins, copolymers thereof, and mixtures thereof. Generally, these polymers can be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present coating compositions.

Thermosetting coating compositions typically comprise a crosslinking agent that may be selected from any of the crosslinkers described above or known in the art to react with the functionality used in the coating. In certain embodiments, the present coatings comprise a thermosetting film-forming polymer or resin and a crosslinking agent therefor and the crosslinker is either the same or different from the crosslinker that is used to crosslink the polyesters described herein. In certain other embodiments, a thermosetting film-forming polymer or resin having functional groups that are reactive with themselves are used; in this manner, such thermosetting coatings are self-crosslinking.

In certain embodiments, the coatings of the present invention also include a curing catalyst. Any curing catalyst typically used to catalyze crosslinking reactions between polyester resins and crosslinkers may be used, and there are no particular limitations on the catalyst. Non-limiting examples of such a curing catalyst include phosphoric acid, alkyl aryl sulphonic acid, dodecyl benzene sulphonic acid, dinonyl naphthalene sulphonic acid, and dinonyl naphthalene disulphonic acid, complexes of organometallic compounds including tin, zinc or bismuth, or tertiary amine bases. "Curing" refers to bond formation between the polyester and crosslinker resulting in the formation of a crosslinked coating. Curing may occur upon application of an external stimulus including, but not limited to, heat, ultraviolet irradiation, exposure to moisture, and exposure to atmospheric oxygen.

In certain embodiments, the coatings of the present invention may comprise from 0 to 7 weight %, such as from 0.001 to 5 weight % of a curing catalyst based on the total weight of the coating composition.

The coating compositions of the present invention can also include other optional materials well known in the art of formulating coatings. For example, the coating compositions of the present invention can also include a colorant. As used herein, "colorant" refers to any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. A "filler", on the other hand, does not necessarily impart any color and/or opacity and/or other visual effect to the composition.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone-isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution).

In order to minimize re-agglomeration of nanoparticles within the composition and resulting coating, a dispersion of resin-coated nanoparticles can sometimes be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U. S. Pat. No. 7,605,194 at col. 3, line 56 to col. 16, line 25, the cited portion of which being incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

Other non-limiting examples of materials that can be used with the coating compositions of the present invention include plasticizers, abrasion resistant particles, corrosion resistant particles, corrosion inhibiting additives, fillers including, but not limited to, micas, talc, clays, and inorganic minerals, anti-oxidants, hindered amine light stabilizers, UV light absorbers and stabilizers, surfactants, flow and surface control agents, thixotropic agents, fillers, organic cosolvents, reactive diluents, catalysts, reaction inhibitors, and other customary auxiliaries.

In certain embodiments, the optional materials such as colorants may comprise from 0 weight % to 80 weight %, such as from 0.01 weight % to 60 weight % based on total weight of the coating composition.

The coatings of the present invention can be applied to a wide range of substrates known in the coatings industry. For example, the coatings of the present invention can be applied to automotive substrates, industrial substrates, packaging substrates, wood flooring and furniture, apparel, electronics including housings and circuit boards, glass and transparencies, sports equipment including golf balls, and the like. These substrates can be, for example, metallic or non-metallic. Metallic substrates include tin, steel, tin-plated steel, chromium passivated steel, galvanized steel, aluminum, aluminum foil. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coatings of the present invention can be applied by any means standard in the art, such as electrocoating, spraying, electrostatic spraying, dipping, rolling, brushing, and the like. The coatings of the present invention can be applied to a dry film thickness of 0.05 mils to 20 mils, such as from 0.5 mils to 5 mils, or from 0.8 mils to 3 mils.

The polyesters described above can be used in a variety of coating types. For example, the polyesters can be used with a one component (1K), or multi-component compositions such as two component (2K) or more. As used herein, a 1K coating composition refers to a composition wherein all the coating components are maintained in the same container after manufacture, during storage, etc. In a 1K coating, the reactive components do not readily react at ambient or slightly thermal conditions, but instead only react upon activation by an external energy source. As used herein, "ambient conditions" refers to room temperature and humidity conditions or temperature and humidity conditions that are typically found in the area in which the coating composition is being applied to a substrate, while "slightly thermal conditions" are temperatures that are slightly above ambient temperature but are generally below the curing temperature for the coating composition. A 1K coating can be applied to a substrate and cured by any conventional means, such as by heating, forced air, and the like. In contrast, a multi-component composition such as a 2K composition refers to a coating in which various components are maintained separately until just prior to application. In a multi-component composition, the reactive components readily react and cure without activation from an external energy source.

The coating compositions of the present invention may be used as a clearcoat or pigmented coat. A clearcoat refers to a coating that is substantially transparent. A clearcoat can, therefore, have some degree of color, provided it does not make the clearcoat opaque or otherwise affect, to any significant degree, the ability to see the underlying substrate. In contrast, a pigmented coat will impart some sort of color and/or other visual effect to the substrate to which it is applied.

The coating compositions of the present invention may also be used alone or in combination as primers, basecoats, and/or topcoats. A "primer coating composition" refers to coating compositions from which an undercoating may be deposited onto a substrate in order to prepare the surface for application of a protective or decorative coating system. Such compositions are often topcoated with a protective and decorative coating system, such as a monocoat topcoat or a combination of a pigmented base coating composition and a clearcoat composition.

The following examples are presented to demonstrate the general principles of the invention. The invention should not be considered as limited to the specific examples presented. All parts and percentages in the examples are by weight unless otherwise indicated.

EXAMPLE 1

Preparation and Evaluation of a Polyester

A polyester according to the present invention was prepared by adding 3543.8 grams of trimethylol propane, 1559.3 grams of succinic acid, 2897.3 grams of benzoic acid, and 8.0 grams of triphenyl phosphite to a suitable reaction vessel equipped with a stirrer, temperature probe, a glycol recovery distillation setup (packed column with empty column on top and distillation head connected to a water cooled condenser), and a nitrogen sparge. The contents of the reactor were gradually heated to 215° C. with continuous removal of water distillate beginning at about 150° C. The temperature of the reaction mixture was held at 215° C. until about 862.4 grams of water had been collected and the acid value of the reaction mixture was 1.5 mg KOH/g. The contents of the reactor were cooled to 100° C. before pouring out. The final resin solution had a measured percent solids (110° C./1 hour) of about 98.1%, an acid value of 1.42 mg KOH/g, and a hydroxyl value of 227.2 mg KOH/g. The glass transition temperature (Tg) of the polyester was −14° C., as determined by differential scanning calorimetry (TAI Discovery DSC). Gel permeation chromatography was used with tetrahydrofuran solvent and polystyrene standards to determine a. weight average molecular weight of 1006 g/mol. The polydispersity of the polyester was 1.9. Refractive index measurements were performed on a Bausch % Lomb Model 33-46-10 Refractometer in accordance with ASTM D1218-87. The refractive index of the polyester was 1.5282. The dynamic viscosity of the polyester was measured at 40° C., and 110° C. on a Physica MCR 301 rheometer with 25 mm parallel plate and 0.1 mm gap as a function of increasing shear rate (0.1 to 10 s$^{-1}$). The viscosity results are shown in Table 1.

TABLE 1

| | Shear Rate (s$^{-1}$) of 0.1 | Shear Rate (s$^{-1}$) of 1 | Shear Rate (s$^{-1}$) of 10 |
|---|---|---|---|
| Viscosity (cPs) at 40° C. | 66,400 | 65,300 | 64,600 |
| Viscosity (cPs) at 110° C. | 14,650 | 14,300 | 12,850 |

Based on the data shown above, the average dynamic viscosity of the polyester at 40° C. was determined to be 65,433.3 centipoise, and the average dynamic viscosity of the polyester at 110° C. was determined to be 13,933.3 centipoise.

The density of the polyester at 40° C. was 1.183 g/mL using a U.S. Standard Weight Per Gallon cup supplied from Gardco. Based on the density and the average dynamic viscosity of the polyester, the kinematic viscosity of the polyester at 40° C. was determined to be 55,311.3 centistoke.

EXAMPLE 2

Preparation of a Polyester

A polyester according to the present invention was prepared by adding 1550.5 grams of trimethylol propane, 682.5 grams of succinic acid, 1267.8 grams of benzoic acid, 164.8 grams of Solvesso 100 (Naphtha (Petroleum) solvent, commercially available from Exxon-Mobil), 1.75 grams of di-butyl tin oxide and 3.5 grams of triphenyl phosphite to a suitable reaction vessel equipped with a stirrer, temperature probe, and Dean-Stark trap with a condenser, under a nitrogen atmosphere. The contents of the reactor were gradually heated to 230° C. with continuous removal of water distillate beginning at about 150° C. The temperature of the reaction mixture was held at 230° C. until about 402 grams of water had been collected and the acid value of the reaction mixture was 1.3 mg KOH/g. The contents of the reactor were cooled to 120° C. before thinning to 85% theoretical solids with 109.8 grams of Solvesso 100 (Naphtha (Petroleum) solvent, commercially available from Exxon-Mobil) and 274.7 grams of n-butyl acetate. The final resin solution had a measured percent solids (110° C./1 hour) of about 84.5%, a Gardner-Holt viscosity of Z1-Z2, an acid value of 0.6 mg KOH/g, and a hydroxyl value of 190.2 mg KOH/g. Gel permeation chromatography was used with tetrahydrofuran solvent and polystyrene standards to determine a weight average molecular weight of 1000 g/mol.

EXAMPLE 3

Preparation of a Polyester

A polyester according to the present invention was prepared by adding 808.5 grams of trimethylol propane, 440.3 grams of adipic acid, 551.3 grams of benzoic acid, 0.9 grams of di-butyl tin oxide and 1.8 grams of triphenyl phosphite to a suitable reaction vessel equipped with a stirrer, temperature probe, a glycol recovery distillation setup (packed column with empty column on top and distillation head connected to a water cooled condenser), and a nitrogen sparge. The contents of the reactor were gradually heated to 215° C. with continuous removal of water distillate beginning at about 165° C. The temperature of the reaction mixture was held at 215° C. until about 172 grams of water had been collected and the acid value of the reaction mixture was 2.0 mg KOH/g sample. The contents of the reactor were cooled to 122° C. before thinning to 85% theoretical solids with 199.4 grams of Solvesso 100 (Naphtha (Petroleum) solvent, commercially available from Exxon-Mobil) and 85.5 grams of n-butyl acetate. The final resin solution had a measured percent solids (110° C./1 hour) of about 82.84%, a Gardner-Holt viscosity of X-, an acid value of 1.60 mg KOH/g, and a hydroxyl value of 222.0 mg KOH/g. Gel permeation chromatography was used with tetrahydrofuran solvent and polystyrene standards to determine a weight average molecular weight of 1225 g/mol.

EXAMPLE 4

2K Yellow Pigmented Monocoat Preparation

A yellow pigmented monocoat according to the present invention was prepared from the following mixture of ingredients as listed in Table 2.

TABLE 2

| Ingredient | Weight (grams) |
| --- | --- |
| Polyester of Example 1 | 32.9 |
| n-Butyl Acetate | 5.3 |

TABLE 2-continued

| Ingredient | Weight (grams) |
| --- | --- |
| Ethyl 3-Ethoxypropionate | 2.1 |
| Eastman C-11 Ketone[1] | 1.7 |
| Oxsol 100[2] | 4.4 |
| Methyl Acetate | 4.4 |
| Solvesso 100 Fluid[3] | 3.2 |
| Disperbyk-110[4] | 1.1 |
| Mapico 1050A[5] | 13.4 |
| Tiona 595[6] | 3.2 |
| Dynoadd F-201[7] | 0.3 |
| Tinuvin 292[8] | 1.1 |
| Tinuvin 328[9] | 0.6 |
| Dibutyltin Dilaurate | 0.02 |
| 2-Ethylhexanoic Acid | 1.1 |
| Desmodur N 3300A[10] | 25.2 |

[1]Mixture of ketone solvents, commercially available from Eastman Chemical Co.
[2]Benzene, 1-Chloro-4 (Trifluoromethyl), commercially available from OXSOL.
[3]Naphtha (Petroleum) solvent, commercially available from Exxon-Mobil.
[4]Wetting and dispersing additive, commercially available from BYK.
[5]Ferric oxide hydrate (pigment), commercially available from Rockwood.
[6]Titanium dioxide (pigment), commercially available from Crystal Global.
[7]Flow additive, commercially available from Dynea Corporation.
[8]Light stabilizer, commercially available from Ciba Specialty Chemicals.
[9]Light stabilizer, commercially available from Ciba Specialty Chemicals.
[10]Polyfunctional aliphatic isocyanate resin based on hexamethylene diisocyanate (HDI), commercially available from Bayer MaterialScience.

The polyester from Example 1 was added together in an appropriate sized container with n-butyl acetate, ethyl 3-ethoxypropionate, Eastman C-11 Ketone, Solvesso 100 Fluid, Mapico 1050A, Tiona 595, and Disperbyk-110. The pigments, Mapico 1050A and Tiona 595 were dispersed under high shear force until a particle size of less than 10 μm was obtained, determined by a Hegman "Fineness of Grind Gauge" in accordance with ASTM D1210. The remaining solvents (methyl acetate and Oxsol 100) and all other ingredients except for the isocyanate crosslinker (Desmodur N 3300A) were added to the pigment grind concentrate and stirred under low shear conditions until the ingredients were well incorporated and a homogeneous mixture was observed. The isocyanate crosslinker (Desmodur N 3300A) was then added to the pigmented portion of the coating. The mixed coating was applied at ambient temperature and humidity conditions using a Graco AirPro compliant spray gun over a solvent borne 2K polyurethane primer on a Bondrite B-1000 iron-phosphate (with deionized water rinse) treated cold-rolled steel substrate and then cured by baking in an oven at 180° F. for 30 minutes. The resultant primer and topcoat combination was tested for various physical and performance properties. The physical and performance properties of the cured coating are shown below in Table 3.

TABLE 3

| Physical/Performance Test | Result |
| --- | --- |
| 20° Gloss[1] | 88 |
| % Non-Volatile Matter (Volume)[2] | 64.6 |
| VOC (lbs./gal)[3] | 2.6 |
| Pencil Hardness[4] | 4H |
| Solvent Resistance[5] | 100+ MEK double rubs |
| Crosshatch Adhesion[6] | 5B |
| Direct Impact[7] | >90 in-lb |
| Reverse Impact[8] | >20 in-lb |
| Mandrel Bend[9] | 0 mm |

TABLE 3-continued

| Physical/Performance Test | Result |
|---|---|
| 20° Gloss Retention @ 5000 hrs. Accelerated Weathering[10] | 88.2% |

[1]Specular gloss measured in accordance with ASTM D523.
[2]Volume of non-volatile matter in clear or pigmented coatings measured in accordance with ASTM D2697.
[3]Amount of volatile organic compounds in a coating measured in accordance with ASTM D3960.
[4]Film hardness of a coating tested in accordance with ASTM D3363.
[5]Solvent resistance of an organic coating using methyl ethyl ketone (MEK) solvent rubs measured in accordance with ASTM D5402.
[6]Adhesion of a coating to a substrate measured in accordance with ASTM D3359.
[7]Resistance to cracking caused by direct impact measured in accordance with ASTM D2794.
[8]Resistance to cracking caused by reverse impact measured in accordance with ASTM D2794.
[9]Flexibility of an attached coating and its resistance to cracking when elongated, measured in accordance with ASTM D522.
[10]Gloss retention of a coating after exposure to accelerated weathering conditions measured in accordance with SAE J2527.

As shown above in Table 3, the cured coatings exhibited a high gloss value, a large amount of non-volatile matter, a very low amount of volatile organic compounds (VOCs), and good to excellent film hardness. The cured coatings also exhibited excellent chemical resistance, weathering resistance, and adhesion to the primer as well as a strong resistance to cracking due to impact while maintaining good flexibility.

EXAMPLE 5

2K Clearcoat Preparation

A 2K clearcoat according to the present invention was prepared from the following mixture of ingredients as listed in Table 4.

TABLE 4

| Ingredient | Weight (grams) |
|---|---|
| Polyester of Example 1 | 35.0 |
| Propylene Glycol Monomethyl Ether Acetate | 2.2 |
| Ethyl 3-Ethoxypropionate | 2.0 |
| n-Butyl Acetate | 7.4 |
| Solvesso 100 Fluid[1] | 7.4 |
| Methyl Acetate | 4.6 |
| Oxsol 100[2] | 4.6 |
| Eastman C-11 Ketone[3] | 0.9 |
| Poly(butylacrylate) | 0.6 |
| BYK-141[4] | 0.4 |
| BYK-306[5] | 0.2 |
| BYK-410[6] | 0.4 |
| Tinuvin 292[7] | 1.4 |
| Tinuvin 328[8] | 0.7 |
| 2-Ethylhexanoic Acid | 1.4 |
| Dibutyltin Dilaurate | 0.02 |
| Desmodur N 3300A[9] | 30.8 |

[1]Naphtha (Petroleum) solvent, commercially available from Exxon-Mobil.
[2]Benzene, 1-Chloro-4-(Trifluoromethyl), commercially available from OXSOL.
[3]Mixture of ketone solvents, commercially available from Eastman Chemical Co.
[4]Flow additive, commercially available from BYK.
[5]Flow additive, commercially available from BYK.
[6]Rheology additive, commercially available from BYK.
[7]Light stabilizer, commercially available from Ciba Specialty Chemicals.
[8]Light stabilizer, commercially available from Ciba Specialty Chemicals.
[9]Polyfunctional aliphatic isocyanate resin based on hexamethylene diisocyanate (HDI), commercially available from Bayer Corporation.

The polyester from Example 1 was added together in an appropriate sized container with all ingredients except the isocyanate crosslinker (Desmodur N 3300A) and stirred under low shear conditions until the ingredients were well incorporated and a homogeneous mixture was observed. The isocyanate crosslinker (Desmodur N 3300A) was then added. The mixed coating was applied at ambient temperature and humidity conditions using a Graco AirPro compliant spray gun over an uncured solvent borne 2K polyurethane basecoat on a Bondrite B-1000 iron-phosphate (with DI rinse) treated cold-rolled steel substrate and cured by baking in an oven at 180° F. for 30 minutes. The mixed coating was also applied by drawdown bar (in accordance with ASTM C 4147) to a pre-baked Tedlar PVF film, supplied by DuPont, for subsequent tensile testing. The protective clear coating and the clear cloating/pigmented 2K polyurethane basecoat were tested for various appearance properties, which are shown below in Table 5.

TABLE 5

| Physical/Performance Test | Result |
|---|---|
| 20° Gloss[1] | 88 |
| % Non-Volatile Matter (Volume)[2] | 64.6 |
| VOC (lbs/gal)[3] | 2.7 |
| Distinctiveness of Image[4] | 96 |
| Longwave[5] | 5 |
| Shortwave[6] | 7.5 |
| Dullness[7] | 2 |
| Fischer Microhardness[8] | 147 |
| Youngs Modulus (MPa)[9] | 1164 |
| Yield Strain (%) | 3.33 |
| Yield Stress (MPa) | 32.3 |
| Stress at Break (MPa) | 28.3 |
| Stress at Max Load (MPa) | 40.9 |
| Strain at Break (%) | 10.68 |
| Toughness (MPa) | 3.21 |

[1]Specular gloss measured in accordance with ASTM D523.
[2]Volume of non-volatile matter in clear or pigmented coatings measured in accordance with ASTM D2697.
[3]Amount of volatile organic compounds in a coating measured in accordance with ASTM D3960.
[4]Clarity of images reflected by a coating tested in accordance with ASTM D5767 and measured using Wavescan Dual, available from BYK-Gardner.
[5]Longwave surface texture evaluation of a coating measured using Wavescan Dual, available from BYK-Gardner.
[6]Shortwave surface texture evaluation of a coating measured using Wavescan Dual, available from BYK-Gardner.
[7]Amount of light scattering measured using Wavescan Dual, available from BYK-Gardner.
[8]Microhardness was measured using a microhardness instrument Fischerscope HM 2000 available from Helmut Fischer GMBH & Company of Sindelfingen, Germany.
[9]Tensile measurements were performed on a Mini Instron 44 (50N load cell, R.H. ~60%, R.T. ~70° C., cross-head speed of 10 mm/min, sample dimensions ~25.4 × 12.7 × 0.052 mm).

As illustrated by the test results shown above, the cured coatings have a large amount of non-volatile matter and a very low amount of volatile organic compounds (VOCs). The coatings also exhibited exceptional gloss and appearance properties.

EXAMPLE 6

2K Primer Preparation

A primer according to the present invention was prepared from the following mixture of ingredients as listed in Table 6.

TABLE 6

| Ingredient | Weight (grams) |
|---|---|
| Polyester of Example 1 | 15.0 |
| Epon 834-X-80[1] | 3.1 |
| n-Butyl Acetate | 1.2 |
| Eastman MAK[2] | 15.4 |
| Methyl Acetate | 3.0 |
| Solvesso 100 Fluid[3] | 1.2 |
| Disperbyk-110[4] | 1.0 |
| BYK Anti-Terra U[5] | 0.3 |
| Bentone SD-2[6] | 0.3 |
| Monarch 1300[7] | 0.1 |
| Inhibisil 75[8] | 7.5 |
| Bartex 25[9] | 16.4 |

TABLE 6-continued

| Ingredient | Weight (grams) |
| --- | --- |
| Omyacarb F[10] | 16.4 |
| Tiona 595[11] | 6.7 |
| Hitox[12] | 3.3 |
| Dibutyltin Dilaurate | 0.1 |
| Desmodur N 3300A[13] | 9.0 |

[1]80% solids epoxy resin solution, commercially available from Momentive.
[2]Methyl n-Amyl Ketone, commercially available from Eastman Chemical Co.
[3]Naphtha (Petroleum) solvent, commercially available from Exxon-Mobil.
[4]Wetting and dispersing additive, commercially available from BYK.
[5]Wetting and dispersing additive, commercially available from BYK.
[6]Rheological Additive, commercially available from Elementis.
[7]Black pigment, commercially available from Cabot Corporation.
[8]Calcium modified silica pigment, commercially available from PPG Industries, Inc.
[9]White, barium sulfate extender pigment, commercially available from TOR Mineral International, Inc.
[10]Calcium carbonate, commercially available from Omya, Inc.
[11]Titanium dioxide (pigment), commercially available from Crystal Global.
[12]Titanium dioxide (pigment), commercially available from TOR Mineral International, Inc.
[13]Polyfunctional aliphatic isocyanate resin based on hexamethylene diisocyanate (HDI), commercially available from Bayer Corporation.

The polyester from Example 1 was added to an appropriate sized container with all ingredients except for methyl acetate, dibutyltin dilaurate (catalyst), and the isocyanate crosslinker (Desmodur N 3300A). The pigments were dispersed under high shear force until a particle size of less than 10 μm was obtained, determined by a Hegman "Fineness of Grind Gauge" as measured in accordance with ASTM D1210. Methyl acetate and dibutyltin dilaurate (catalyst) were added to this pigment grind concentrate and stirred under low shear conditions until the ingredients were well incorporated and a homogeneous mixture was observed. The isocyanate crosslinker (Desmodur N 3300A) was then added to the pigmented portion of the coating. The mixed coating was applied at ambient temperature and humidity conditions using a Graco AirPro compliant spray gun over a Bondrite B-1000 iron-phosphate (with DI rinse) treated cold-rolled steel substrate and cured by baking in an oven at 180° F. for 30 minutes. The resulting primer coating was tested for various physical and performance properties, which are shown below in Table 7.

TABLE 7

| Physical/Performance Test | Result |
| --- | --- |
| % Non-Volatile Matter (Volume)[1] | 56.7 |
| VOC (lbs./gal)[2] | 3.0 |
| Avg. Scribe Creep (500 hrs. Salt Spray)[3] | 2.5 mm |
| Avg. Scribe Creep (40 cycles. Cyclic Corrosion)[4] | 3.45 mm |
| Reverse Impact[5] | >60 in-lb |

[1]Volume of non-volatile matter in clear or pigmented coatings measured in accordance with ASTM D2697.
[2]Amount of volatile organic compounds in a coating measured in accordance with ASTM D3960.
[3]Corrosion resistance of a coating measured in accordance with ASTM B117 and ASTM D1654.
[4]Corrosion resistance of a coating measured in accordance with ASTM D610, ASTM D716, and ASTM D1654.
[5]Resistance to cracking caused by reverse impact measured in accordance with ASTM D2794.

As illustrated by the test results shown above, the cured coatings have a large amount of non-volatile matter and a very low amount of volatile organic compounds (VOCs). The coatings also exhibited good corrosion resistance and flexibility.

EXAMPLE 7

1K Aminoplast Clearcoat Preparation

A 1K clearcoat coating according to the present invention was prepared from the following mixture of ingredients as listed in Table 8.

TABLE 8

| Ingredient | Weight (grams) |
| --- | --- |
| Polyester of Example 3 | 87.0 |
| Acrylic Resin[1] | 41.0 |
| Solvesso 100 Fluid[2] | 60 |
| Eversorb 93[3] | 2 |
| Eversorb 74[4] | 4 |
| DDBSA[5] | 2 |
| Cymel 202[6] | 24.0 |
| Additol XL 480[7] | 0.04 |
| WorleeAdd 315[8] | 0.2 |

[1]The acrylic resin comprises 30% 2-hydroxyethyl acrylate, 22% styrene, 10% 2-ethylhexyl acrylate, 38% n-butyl acrylate; at 65% solids in Solvesso 100.
[2]Naphtha (Petroleum) solvent, commercially available from Exxon-Mobil.
[3]Hindered amine light stabilizer (HALS), commercially available from Everlight Chemical Industrial Corp.
[4]Ultraviolet light absorber, commercially available from Everlight Chemical Industrial Corp.
[5]Dodecylbenzene sulfonic acid, commercially available from Cytec Industries.
[6]High imino mixed melamine, commercially available from Cytec Industries.
[7]Flow Additive, commercially available from Cytec Industries.
[8]Silicone flow additive, commercially available from Worlee Chemie.

The polyester from Example 3 was added together with all ingredients to an appropriate sized container and stirred under low shear conditions until all ingredients were well incorporated and a homogeneous mixture was observed. The mixed coating was applied at ambient temperature and humidity conditions using a Binks Model 62 conventional spray gun over precured electrocoated steel substrate and cured by baking in an oven at 285° F. for 30 minutes. The resulting coatings were tested for various physical and performance properties, which are shown below in Table 9.

TABLE 9

| Physical/Performance Test | Result |
| --- | --- |
| 20° Gloss[1] | 96 |
| % Non-Volatile Matter (Volume)[2] | 58 |
| Fischer Micro Hardness[3] | 153 |
| 9 μm Scratch Retention[4] | 70 |
| Erickson Chip[5] | 2 |
| Sulfuric acid resistance[6] | 3 |
| 20° Gloss Retention @ 5000 hrs. Accelerated Weathering[7] | 100% |
| Haze Retention @ 5000 hrs. Accelerated Weathering[8] | 54 |

[1]Specular gloss measured in accordance with ASTM D523.
[2]Volume of non-volatile matter in clear or pigmented coatings measured in accordance with ASTM D2697.
[3]Microhardness was measured using a microhardness instrument Fischerscope HM 2000 available from Helmut Fischer GMBH & Company of Sindelfingen, Germany.
[4]Tester Model CM-5 (electric powered version), available from Atlas Electrical Devices Co., was used to test scratch retention. Nine micron wet or dry abrasive paper available from 3M Corp was cut into two inch by two-inch squares and the paper is controllably run back and forth on the panel for 10 times. Percent retention was expressed as the percentage of the 20° Gloss retained after the surface was scratched by the scratch tester. Scratch Resistance = (Scratch Gloss/Original Gloss) x 100.
[5]Chip resistance measured with Erichson stone testing instrument model # 508. A rating of zero being best.
[6]Acid testing was done using GM Opel (GM 60409) test, in which a 400 microliter drop of 36% Sulfuric Acid was placed on each panel for three days and the resulting damage recorded. The rating scale is: 0 = OK/1 = Light Ring/2 = Ring/3 = Light Whitening and/or blistering/4 = white & swollen, matte, strong blistering/5 = total damage.
[7]Gloss retention of a coating after exposure to accelerated weathering conditions measured in accordance with SAE J2527.
[8]Amount of haze in a coating after exposure to accelerated weathering conditions measured in accordance with SAE J2527 using a BYK/Haze Gloss instrument following the manufacturer's instructions.

As illustrated by the test results shown above, the cured coating contains a large amount of non-volatile matter while exhibiting excellent weather resistance and good acid resistance, hardness, scratch resistance, and chip resistance.

Whereas particular embodiments of this invention have been described above for purposes of illustration, it will be evident to those skilled in the art that numerous variations of the details of the present invention may be made without departing from the invention as defined in the appended claims.

The invention claimed is:

1. A polyester prepared from a mixture of reactants comprising:
   a) an aromatic monoacid, wherein the aromatic monoacid comprises from 25 to 60 weight % based on the total weight of reactants;
   b) a polyacid, wherein the polyacid comprises less than 90 mole % isophthalic acid; and
   c) a polyol comprising at least 3 hydroxyl groups,
   wherein the mixture of reactants contain less than 1000 parts per million of a non-aromatic monoacid, and said polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), an acid value of less than 15 mg KOH/g, and a glass transition temperature of less than 0° C.

2. A polyester prepared from a mixture of reactants consisting essentially of:
   a) an aromatic monoacid, wherein the aromatic monoacid comprises from 25 to 60 weight % based on the total weight of reactants;
   b) a polyacid, wherein the polyacid comprises less than 90 mole % isophthalic acid; and
   c) a polyol comprising at least 3 hydroxyl groups,
   wherein the mixture of reactants contain less than 1000 parts per million of a non-aromatic monoacid, and said polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), an acid value of less than 15 mg KOH/g, and a glass transition temperature of less than 0° C.

3. A polyester prepared from a mixture of reactants comprising:
   a) an aromatic monoacid, wherein the aromatic monoacid comprises from 25 to 60 weight % based on the total weight of reactants;
   b) an aliphatic polyacid; and
   c) a polyol comprising at least 3 hydroxyl groups,
   wherein the mixture of reactants contain less than 1000 parts per million of a non-aromatic monoacid, and said polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), an acid value of less than 15 mg KOH/g, and a glass transition temperature of less than 0° C.

4. A coating composition comprising:
   a) a polyester prepared from a mixture of reactants comprising:
      1) an aromatic monoacid, wherein the aromatic monoacid comprises from 25 to 60 weight % based on the total weight of reactants;
      2) an aliphatic polyacid; and
      3) a polyol comprising at least 3 hydroxyl groups,
      wherein the mixture of reactants contain less than 1000 parts per million of a non-aromatic monoacid, and said polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), an acid value of less than 15 mg KOH/g; and a glass transition temperature of less then 0° C.; and
   b) a crosslinker.

5. A coating composition comprising:
   a) a polyester prepared from a mixture of reactants comprising:
      1) an aromatic monoacid, wherein the aromatic monoacid comprises from 25 to 60 weight % based on the total weight of reactants;
      2) a polyacid, wherein the polyacid comprises less than 90 mole % isophthalic acid; and
      3) a polyol comprising at least 3 hydroxyl groups,
      wherein the mixture of reactants contain less than 1000 parts per million of a non-aromatic monoacid, and said polyester has a dynamic viscosity of greater than 15,000 centipoise at 40° C. as measured by a Physica MCR 301 rheometer with 25 mm parallel plate and 0.1 mm gap as a function of increasing shear rate (0.1 to 10 $s^{-1}$), an acid value of less than 15 mg KOH/g; and a glass transition temperature of less then 0° C.; and
   b) a crosslinker.

6. The coating composition of claim 5, wherein the mixture of reactants contain less than 20 parts per billion of an non-aromatic monoacid.

7. The coating composition of claim 5, wherein the coating composition contains less than 1000 parts per million of water.

8. The coating composition of claim 5, wherein the coating composition contains less than 20 parts per billion of water.

9. A substrate at least partially coated with the coating composition of claim 5.

10. The coating composition of claim 5, wherein the polyol comprises from 25 to 60 weight % based on the total weight of the reactants.

11. The coating composition of claim 5, wherein the aromatic monoacid comprises benzoic acid, salicylic acid, 4-hydroxyl benzoic acid, or mixtures thereof.

12. The coating composition of claim 5, wherein the polyacid comprises succinic acid, adipic acid, hexahydrophthalic anhydride (HHPA), cyclohexanedicarboxylic acid (CHDA), or mixtures thereof.

13. The coating composition of claim 5, wherein the polyol comprises trimethylolpropane, glycerol, pentaerythritol, or mixtures thereof.

14. The coating composition of claim 5, wherein the polyacid comprises from 10 to 30 weight % based on the total weight of the reactants.

15. The coating composition of claim 5, wherein the mixture of reactants further comprise a second polyol comprising 2 hydroxyl groups.

16. The coating composition of claim 5, wherein the polyester has a hydroxyl value of 140 to 340 mg KOH/g.

17. The coating composition of claim 5, wherein the polyester has a weight average molecular weight of less than or equal to 2,500 g/mol.

18. The coating composition of claim 5, wherein the polyacid comprises 10 carbons or less.

* * * * *